UNITED STATES PATENT OFFICE.

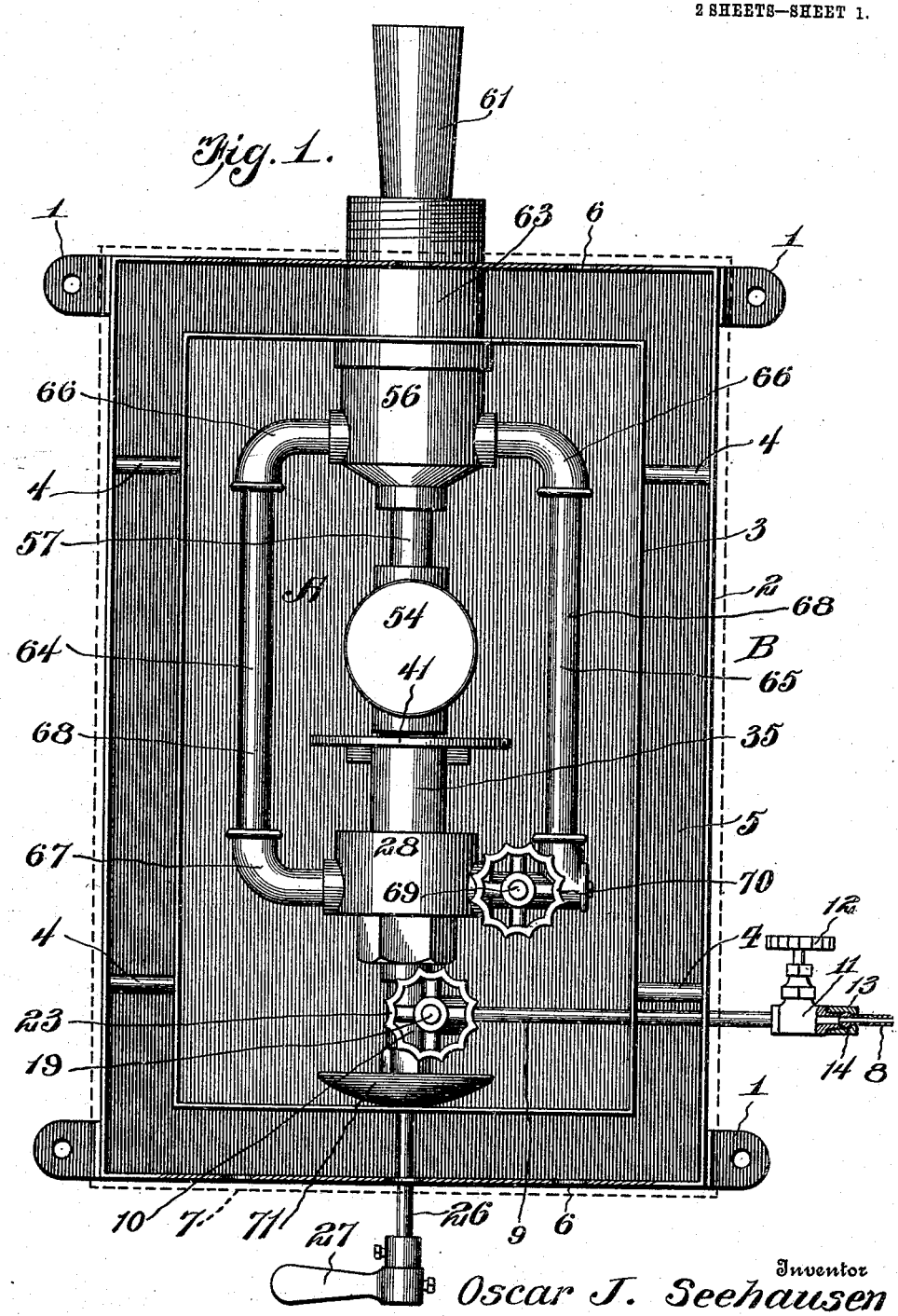

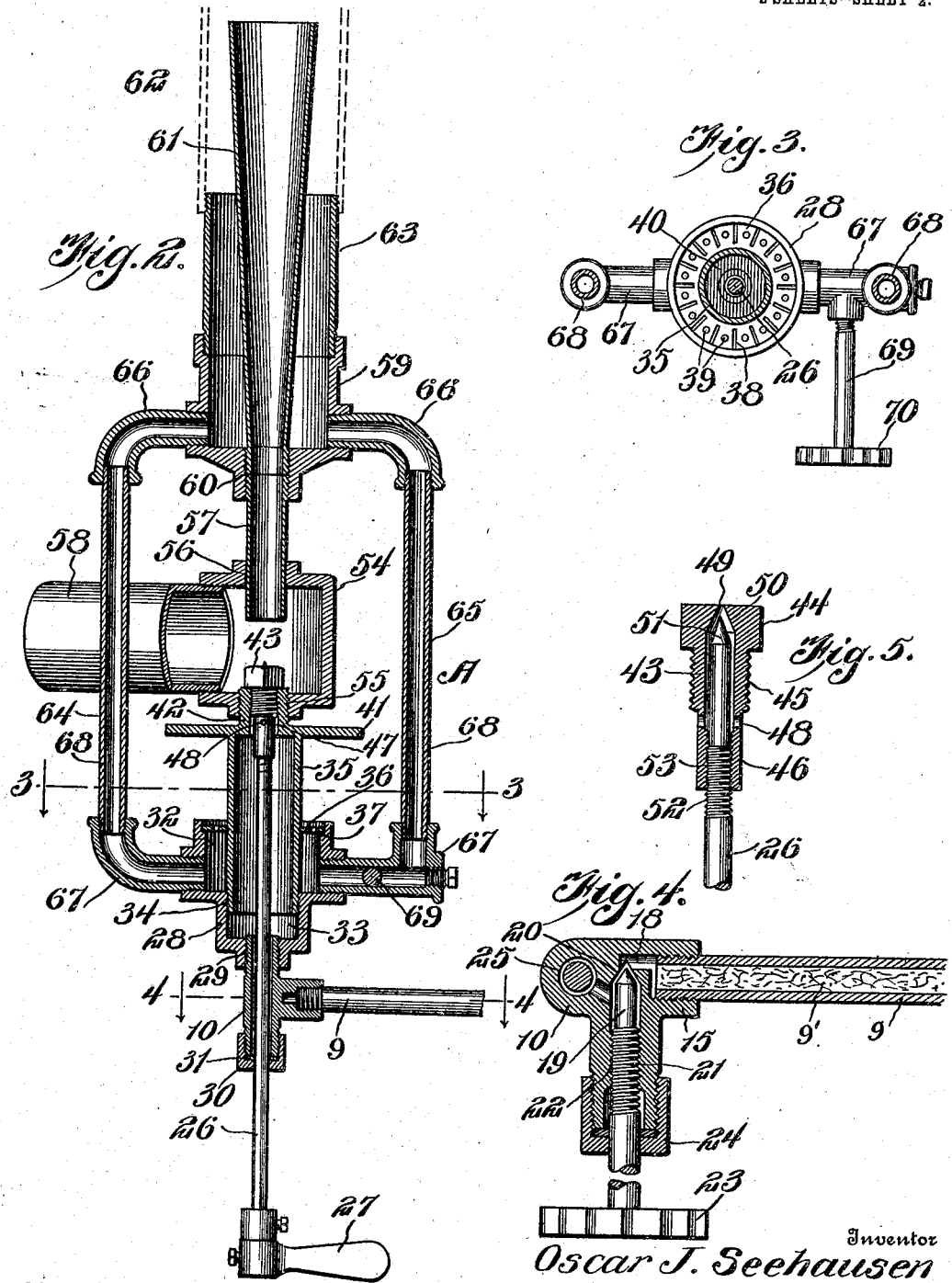

OSCAR J. SEEHAUSEN, OF CHICAGO, ILLINOIS.

GENERATOR FOR HYDROCARBON LIGHTING SYSTEMS.

No. 930,891.  Specification of Letters Patent.  Patented Aug. 10, 1909.

Application filed April 6, 1908. Serial No. 425,433.

*To all whom it may concern:*

Be it known that I, OSCAR J. SEEHAUSEN, a citizen of the United States, residing at Chicago, in the county of Cook and State of Illinois, have invented new and useful Improvements in Generators for Hydrocarbon Lighting Systems, of which the following is a specification.

This invention relates to lighting systems of that type in which the gas is produced from a liquid hydro carbon which is vaporized by the application of heat and mixed with an appropriate amount of air before being supplied to the lights, and it relates more particularly to a generator of that character in which the liquid hydro carbon such as alcohol, gasolene or the like, is vaporized by an auxiliary or pilot burner flame and mixed with air preparatory to passing to the service pipe of the lighting system, a portion of the mixture thus produced being by-passed to the auxiliary burner for maintaining the continuous vaporization of the liquid hydro-carbon in accordance with the demand for gas.

The invention has for one of its objects to improve and simplify the construction and operation of generators of this character so as to be comparatively easy and inexpensive to manufacture, highly efficient, safe and reliable in service, and so designed as to insure a steady burning of the lamps or lights without danger of breakage of mantles, globes or the like since back flaring is effectively eliminated.

A further object of the invention is the provision of a protective casing for the generator which is so designed as to permit a free circulation of air therethrough so that danger of fire is reduced to a minimum in case of leakage and ignition of the liquid hydro carbon.

Another object of the invention is to provide means for controlling the supply of mixture to the auxiliary burner so as to regulate the generator to operate any desired number of mantles, as for instance, as low as three or as high as fifty, without in any way changing the mechanism of the generator.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one of the embodiments of the invention, Figure 1 is a front view of the generator with the door of the casing removed. Fig. 2 is a central vertical section thereof. Fig. 3 is a horizontal section on line 3—3, Fig. 2. Fig. 4 is a similar section on line 4—4, Fig. 2, drawn on an enlarged scale. Fig. 5 is an enlarged sectional view of the burner or nozzle showing the needle-regulating valve.

Similar reference characters are employed to designate corresponding parts throughout the several views.

Referring to the drawings, A designates the generator which is inclosed in a metal casing B, the latter being secured to a suitable support by fastenings passing through apertured lugs 1. The casing is composed of an outer box 2 and an inner box or chamber 3 spaced from the walls of the outer box by members 4, thereby forming an air space or chamber 5. The outer box 2 has its bottom and top provided with perforations 6 for insuring a free circulation of air through the space 5 and thereby keeping the outer shell of the casing comparatively cool in case of ignition of fuel from the generator through failure to cut off the supply or any other cause. The casing has a door which is indicated by the dotted line 7 which closes the inner and outer shell so as to form a complete housing for the generator.

The generator A is fed with liquid fuel, such as alcohol, gasolene or the like, by means of a small pipe 8 that discharges into a tube 9 which passes through apertures in the wall of the inner and outer shells of the casing and screws into the fitting or connection 10. This tube is of larger diameter than the supply pipe 8 and is filled with a porous material 9', such as asbestos, which operates to prevent a back flare of gas through the generator in case the pressure in the fuel reservoir or storage tank should fall too low. At the outer end of the tube 9 is a controlling valve 11 manually operated by the hand wheel 12 for regulating the flow of fuel, and the pipe 8 is secured to the casing of the valve 11 by a nut 13 engaging the tail piece 14 on the said pipe. The function of the asbestos-filled tube 9 is an important feature of the present invention for the reason that a flare back is detrimental in that it destroys the mantles and glassware of the lamps. The connection 10 is provided with a fuel-conducting passage 18 that communicates with the coupling 9 and the flow of fuel is regulated by a needle valve 19 that is adapted to coöperate with the seat 20, the needle valve being threaded at 21 to engage the threads 22, and the outer end of the stem of the needle valve is equipped with a hand wheel 23 for enabling the valve to be readily manipulated, there being a packing 24 around the stem for preventing leakage of liquid fuel. The fitting 10 has a vertical bore 25 through which passes the stem 26 of the needle valve that controls the nozzle or tip of the generator, there being a lever 27 on the bottom end of the stem for manipulating the valve. The fitting 10 is connected with the body 28 of the pilot or auxiliary burner, the bottom of the burner being provided with a threaded opening 29 into which the upper end of the fitting 10 screws. On the bottom end of the fitting is a nut 30 for compressing the packing ring 31 around the stem 26 of the needle-regulating valve.

The burner body 28 is a metal casting formed into an upper cylindrical chamber 32 and a lower cylindrical chamber 33 somewhat smaller than the other. The lower chamber is interiorly threaded at 34 for receiving the lower threaded end of the vapor-generating cylinder 35. The cylinder or hollow body 35 rises out of the burner body 28, and fitted around the cylinder is a ring 36 that is seated on an internal annular shoulder 37 at the upper end of the body 28, the said ring being provided with radial slots 38 and apertures 39, as clearly shown in Fig. 3, for permitting gas to discharge therefrom. This gas, which is produced by a mixture of air and vapor supplied from the generator, burns as a blue flame that encircles the wall of the vaporizing chamber 40 so as to effectively heat the same. The upper end of the hollow body 35 is formed into a horizontal disk 41 that is disposed directly over the blue flame of the auxiliary burner and serves as a heat concentrator. Rising from the disk 41 is a hollow boss 42 that is interiorly threaded for receiving the nozzle or tip 43 of the generator. This tip has a non-circular head 44 for receiving a wrench whereby the tip can be screwed into the boss 42, the said tip having a threaded portion 45 for engagement with the boss. The lower end of the tip is reduced, as at 46, so as to provide a passage 47 between the bore of the boss 42 and said reduced end of the tip for vapor to flow through the ports 48 of the tip. The tip, which is hollow, is formed with a jet-discharging opening 49 through which the vapor issues at a high velocity, and adjacent this opening is a conical seat 50 which coöperates with the needle valve 51 for regulating the size and velocity of the jet. The stem 26 of the needle valve has a threaded portion 52 that engages the internal threads 53 provided in the bore of the tip at a point below the ports or openings 48, as clearly shown in Fig. 5. By rotating the valve stem 26 by the lever 27, the needle valve can be moved toward or away from the valve seat 50.

The vapor-mixing device whereby the vaporized fuel discharging from the nozzle 43 is mixed with air, consists of a hollow body 54 that is preferably a metal casting, the same being supported on and attached to the vaporizing cylinder by means of the boss 42 screwed into a threaded opening 55 in the bottom of the said mixing chamber 54. This chamber is formed with a non-threaded opening 56 in its top directly in line with its bottom opening 55, and projecting into the top opening is a vertically-disposed "Bunsen" tube 57, the lower end of the tube extending into the mixing chamber a suitable distance whereby the jet discharging into the tube draws with it the requisite supply of air. Leading into the body 54 is an air supply pipe 58 which, in case the generator is located within a building, leads to a point outside the latter so as to draw in fresh air and at the same time prevent any possible leakage of explosive gas from the generator into the building, in case of mismanagement or leakage of the generator. The "Bunsen" tube 57 is supported by a hollow head piece 59 that has a threaded opening 60 in its bottom and into said opening, the lower end of the "Bunsen" tube is threaded. Also threaded in the said opening above the "Bunsen" tube is a funnel-shaped spreader 61 that rises from the hollow head piece 59 and extends into the service pipe 62 indicated by dotted lines, whereby gas is supplied to the various lamps of the lighting system, the service pipe being connected to the head piece by a threaded coupling 63.

The vaporizing flame of the generator is supported by a mixture of air and vapor which is supplied from the head piece 59 through separate by-passes 64 and 65. These by-passes are formed by elbow connections 66 and 67 attached to and communicating with the head piece 59 and burner body 28 respectively, and pipe 68 connected with the elbow connections. By this means, there is a back flow of gas from the service pipe through the by-passes 64 and 65 to the upper cylinder 32 of the burner body so that the generator will operate continuously after once being started. In order to vary the capacity of the generator to suit the number of lights to be used, the by-pass 65 has a controlling valve 69, the stem of which has a hand wheel 70 for conveniently opening and closing the valve. When the valve is completely closed, a minimum amount of gas is supplied to the burner and hence the generating capacity will be minimum, and by opening the valve to different degrees, the capacity can be enlarged to suit the demand for gas in the lighting system. By controlling the supply of mixture to the auxiliary burner in this manner, it will be found in practice that the system can be adjusted for efficient operation when the number of mantles in use is varied over a wide range, as for instance, a uniform and sufficient supply of gas can be maintained to operate as few as three mantles or as many as fifty with one size of generator. With a generator of this construction, there is no necessity for a mineral filler of any kind, such as asbestos wicking, in the vaporizing chamber, and the fluid as it enters the vaporizing chamber is converted into a gaseous state which exerts a back pressure sufficient to overcome the pressure of the fuel fed from the tank, thus preventing an excess flow of fuel at any time to the chamber. Another important feature of the invention is the arrangement of the needle valve 51 whereby the same acts as an anti-pulsator, thus insuring a uniform operation of the system. In case of leakage of liquid gasolene, a drip cup 71, Fig. 1, is provided at the bottom of the generator with which the liquid fuel can be collected.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. In a generator, the combination of a burner body, a vaporizer arranged therein and coöperating with the body to form a gas-receiving chamber, an apertured removable ring surrounding and fitted to the vaporizer and supported on the body for supplying the burner flame, a disk on the vaporizer arranged over the ring, a mixing chamber supported on the vaporizer, a nozzle discharging into the mixing chamber, a Bunsen tube leading into the chamber at a point in line with the nozzle, a supply pipe communicating with the chamber, means for supplying fuel to the vaporizer, a controlling valve for the nozzle, and a stem for the valve extending upwardly through the vaporizer.

2. In a generator, the combination of a burner body, a vaporizer arranged to be heated by the flame from the burner, a disk formed on the top of the vaporizer, a central boss on the disk, a mixing chamber supported on the boss above the disk, an air supply pipe connected with the chamber, a tube leading into the chamber, a nozzle on the boss for discharging vapor from the vaporizer to the said tube, a head piece supporting the said tube, by-passes extending from the head piece to the burner body and supporting the head piece, and a service pipe connected with the head piece.

3. In a generator, the combination of a burner body, a fuel supply pipe, a connection between the pipe and the bottom of the burner body, a rod extending through the connection, a packing box around the rod where the same enters the said connection, a vaporizer supported on the burner body and receiving liquid fuel through the said connection, a nozzle removably mounted in the upper end of the vaporizer, having a valve-seat, a valve on said rod adapted to engage the seat, a mixing chamber removably mounted over the nozzle, an air inlet pipe connected with the said chamber, a Bunsen tube leading into the chamber at a point in line with the nozzle, a discharge conduit for the mixture arranged to receive the mixture from the Bunsen tube, and controllable means for delivering mixture from the said conduit to the burner body.

4. In a generator, the combination of a burner open at the top and having an opening at its bottom, a vaporizer open at its bottom and removably secured in the said burner, means for supplying fuel through the said bottom opening to the vaporizer, said burner having an internal annular shoulder at its top, a perforated ring resting on the shoulder and surrounding the vaporizer, said vaporizer coöperating with the burner to form a gas-receiving chamber, a disk arranged on the vaporizer at a point above the ring, a hollow boss on the top of the vaporizer, a nozzle removably secured in the boss and having ports communicating with the vaporizer, a needle valve threaded in the nozzle, a hollow body having a threaded opening in its bottom for screwing on said boss and having a non-threaded opening in its top, a tube extending into the upper opening and having its lower end spaced from the nozzle, an air supply tube leading into the said hollow body, a head piece supporting the said tube, a spreader in the head piece and communicating with the tube, a by-pass connected with the head piece and burner body, and a service pipe connected with the head piece.

5. In a generator, the combination of a vaporizer having an opening at its top, a nozzle threaded in the opening and provided with a bore internally threaded, a needle valve having a thread engaging the internal thread of the nozzle, a stem for the valve extending out of the bottom of the vaporizer, a burner body into which the lower end of the vaporizer is threaded, a fuel supply connection attached to the burner body and through which the stem passes, elbow connections supported on and communicating with the burner body, a mixing chamber disposed over and secured on the vaporizer, a Bunsen tube extending at its lower end into the mixing chamber, a head piece connected with the upper end of the tube, a service pipe connected with the head piece, elbow connections on the head piece, and pipes connecting the first-mentioned elbow sections with those on the head piece.

In testimony whereof I affix my signature in presence of two witnesses.

OSCAR J. SEEHAUSEN.

Witnesses:
    JOHN L. FLETCHER,
    K. ALLEN.